US011955049B2

(12) United States Patent
Liao et al.

(10) Patent No.: US 11,955,049 B2
(45) Date of Patent: Apr. 9, 2024

(54) DISPLAY PANEL, DRIVING METHOD THEREOF, AND DISPLAY DEVICE

(71) Applicant: Wuhan China Star Optoelectronics Semiconductor Display Technology Co., Ltd., Hubei (CN)

(72) Inventors: Zuomin Liao, Hubei (CN); Songpo Xiang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/263,567

(22) PCT Filed: Nov. 13, 2020

(86) PCT No.: PCT/CN2020/128704

§ 371 (c)(1),
(2) Date: May 22, 2023

(87) PCT Pub. No.: WO2022/057065

PCT Pub. Date: Mar. 24, 2022

(65) Prior Publication Data

US 2023/0306889 A1 Sep. 28, 2023

(30) Foreign Application Priority Data

Sep. 15, 2020 (CN) ......................... 202010968686.9

(51) Int. Cl.
*G09G 3/20* (2006.01)

(52) U.S. Cl.
CPC ... *G09G 3/2092* (2013.01); *G09G 2310/0297* (2013.01)

(58) Field of Classification Search
CPC ............... G09G 3/3688; G09G 3/2092; G09G 2310/0297
See application file for complete search history.

(56) References Cited

U.S. PATENT DOCUMENTS

| | | | |
|---|---|---|---|
| 2017/0345384 A1 | 11/2017 | Ma et al. |
| 2018/0083078 A1 | 3/2018 | Park et al. |
| 2020/0013367 A1 | 1/2020 | Tomie et al. |

FOREIGN PATENT DOCUMENTS

| | | |
|---|---|---|
| CN | 1932939 | 3/2007 |
| CN | 105810173 | 7/2016 |
| CN | 106292096 | 1/2017 |
| CN | 107863071 | 3/2018 |
| CN | 108428433 | 8/2018 |
| CN | 110164351 | 8/2019 |
| CN | 110808005 | 2/2020 |
| CN | 111402826 | 7/2020 |
| KR | 2014-0064158 | 5/2014 |

*Primary Examiner* — Abbas I Abdulselam

(57) ABSTRACT

A display panel and a corresponding driving method are provided, including at least an N−1th stage demultiplexing subcircuit and an Nth stage demultiplexing subcircuit. The N−1th stage demultiplexing subcircuit includes at least M N−1th stage demultiplexing units, wherein M and N are both integers not less than 2. By disposing at least two stages of the demuxing subcircuits in cascade, one signal can time-sharingly multiplex to a plurality of signals and correspondingly exponentially reduce a number of signal wirings.

20 Claims, 4 Drawing Sheets

DISPLAY PANEL, DRIVING METHOD THEREOF, AND DISPLAY DEVICE

RELATED APPLICATIONS

This application is a National Phase of PCT Patent Application No. PCT/CN2020/128704 having International filing date of Nov. 13, 2020, which claims the benefit of priority of Chinese Patent Application No. 202010968686.9 filed on Sep. 15, 2020. The contents of the above applications are all incorporated by reference as if fully set forth herein in their entirety.

FIELD AND BACKGROUND OF THE INVENTION

The present disclosure relates to the field of display technology, particularly to the field of electric circuit technology, and specifically relates to a display panel, a driving method thereof, and a display device.

In designs of display panels, problems preventing high resolution and/or high refresh rates thereof from being realized have not been effectively solved. Not only is there great difficulty facing designs of pixels, but larger numbers of data signal wirings need to be disposed. In order to lower a number of the data signal wirings, one-to-two demultiplexing (demux) circuit designs are mostly used in current display panel products. Although these designs can reduce half of the data signal wirings, in designs of pixels of display panels with high refresh rates, in order to increase charging time of subpixels, a solution that involves one subpixel configured to pair with two data signal wirings is adopted.

Obviously, this solution will double the number of data signal wirings. Therefore, it is more difficult for demux circuit design structures in traditional technical solutions to satisfy development requirements of the market.

SUMMARY OF THE INVENTION

The present disclosure provides a display panel and a driving method thereof, and a display device, solving the problem of a large number of signal wirings.

On a first aspect, the present disclosure provides a display panel, and a demultiplexing circuit is disposed in the display panel, and the demultiplexing circuit at includes an N−1th stage demultiplexing subcircuit and an Nth stage demultiplexing subcircuit. The N−1th stage demultiplexing subcircuit includes at least M N−1th stage demultiplexing units configured to respond to N−1th stage control signals to time-sharingly output corresponding N−1th stage data signals. The Nth stage demultiplexing subcircuit includes at least M+1 Nth stage demultiplexing units, and an input terminal of the Nth stage demultiplexing subcircuit is connected to an output terminal of the N−1th stage demultiplexing subcircuit configured to respond to Nth stage control signals to time-sharingly output corresponding Nth stage data signals. Wherein, an output terminal of one N−1th stage demultiplexing unit is connected to at least two input terminals of the Nth stage demultiplexing units, and M and N are both integers not less than 2.

On the basis of the first aspect, in a first embodiment of the first aspect, the Nth stage demultiplexing units include at least 2M Nth stage demultiplexing units, an input terminal of one N−1th stage demultiplexing unit is at least connected to an input terminal of another N−1th stage demultiplexing unit, different N−1th stage demultiplexing units respond to different N−1th stage control signals, an input terminal of one Nth stage demultiplexing unit is at least connected to an input terminal of another Nth stage demultiplexing unit, and different Nth stage demultiplexing units respond to different Nth stage control signals.

On the basis of the first embodiment of the first aspect, in a second embodiment of the first aspect, the N−1th stage demultiplexing units include an N−1th stage thin film transistor, an input terminal of the N−1th stage thin film transistor is configured to receive an N−2th stage data signal, and a control terminal of the N−1th stage thin film transistor is correspondingly configured to receive the N−1th stage control signals, wherein when N is equal to 2, the N−2th stage data signal is an initial data signal.

On the basis of the second embodiment of the first aspect, in a third embodiment of the first aspect, the Nth stage demultiplexing units include an Nth stage thin film transistor, an output terminal of one N−1th stage thin film transistor is connected to at least two output terminals of the N−1th stage thin film transistor, and the control terminal of the Nth stage thin film transistor is correspondingly configured to receive the Nth stage control signals.

On the basis of the third embodiment of the first aspect, in a fourth embodiment of the first aspect, channel types of the N−1th stage thin film transistors and the Nth stage thin film transistors are same.

On the basis of the fourth embodiment of the first aspect, in a fifth embodiment of the first aspect, the N−1th stage control signals include at least M N−1th stage control subsignals that are sequentially time sharing and effective, and each of the N−1th stage control subsignals is configured to be received by a control terminal of one N−1th stage thin film transistor.

On the basis of the fifth embodiment of the first aspect, in a sixth embodiment of the first aspect, the Nth stage control signals include at least 2M Nth stage control subsignals that are sequentially time sharing and effective, and each of the Nth stage control subsignals is configured to be received by a control terminal of one Nth stage thin film transistor.

On the basis of the sixth embodiment of the first aspect, a frequency of the Nth stage control subsignals and a frequency of the N−1th stage control subsignals are same, and a duration of an effective electric potential of the N−1th stage control subsignals are longer than or equal to two times of a duration of an effective electric potential of the Nth stage control subsignals.

On a second aspect, the present disclosure provides a display device. A display region and a bezel region located on a side of the display region are disposed in the display device. A demultiplexing circuit is disposed in the bezel region. The demultiplexing circuit includes at least an N−1th stage demultiplexing subcircuit and an Nth stage demultiplexing subcircuit. The N−1th stage demultiplexing subcircuit includes at least M N−1th stage demultiplexing units configured to respond to N−1th stage control signals to time-sharingly output corresponding N−1th stage data signals.

The Nth stage demultiplexing subcircuit includes at least M+1 Nth stage demultiplexing units, and an input terminal of the Nth stage demultiplexing subcircuit is connected to an output terminal of the N−1th stage demultiplexing subcircuit configured to respond to Nth stage control signals to time-sharingly output corresponding Nth stage data signals, Wherein, an output terminal of one N−1th stage demultiplexing unit is connected to at least two input terminals of the Nth stage demultiplexing units, and M and N are both integers greater than or equal to 2.

On a third aspect, the present disclosure provides a driving method of a display panel. The display panel includes at least two demultiplexing circuits, a plurality of subpixel distributed in an array manner, and a plurality of data lines connected between the demultiplexing circuits and the subpixels. The driving method includes at least outputting corresponding data signals using different demultiplexing circuits synchronously; temporarily storing the data signals in the data lines to charge corresponding subpixels in advance; responding corresponding scanning signals using the display panel; and writing the data signals to the subpixels in odd rows and even rows in sequence, wherein N is an integer not less than 2.

By disposing at least two stages of the demuxing subcircuits in a cascade manner, the display panel and the driving method thereof, and the display device provided by the present disclosure can make one signal time-sharingly multiplex to a plurality of signals, being able to reduce the number of the signal wirings in a geometric multiple correspondingly.

DESCRIPTION OF SPECIFIC EMBODIMENTS OF THE INVENTION

For making the purposes, technical solutions and effects of the present disclosure be clearer and more definite, the present disclosure will be further described in detail below. It should be understood that the specific embodiments described herein are merely for explaining the present disclosure and are not intended to limit the present disclosure.

Figure 1:
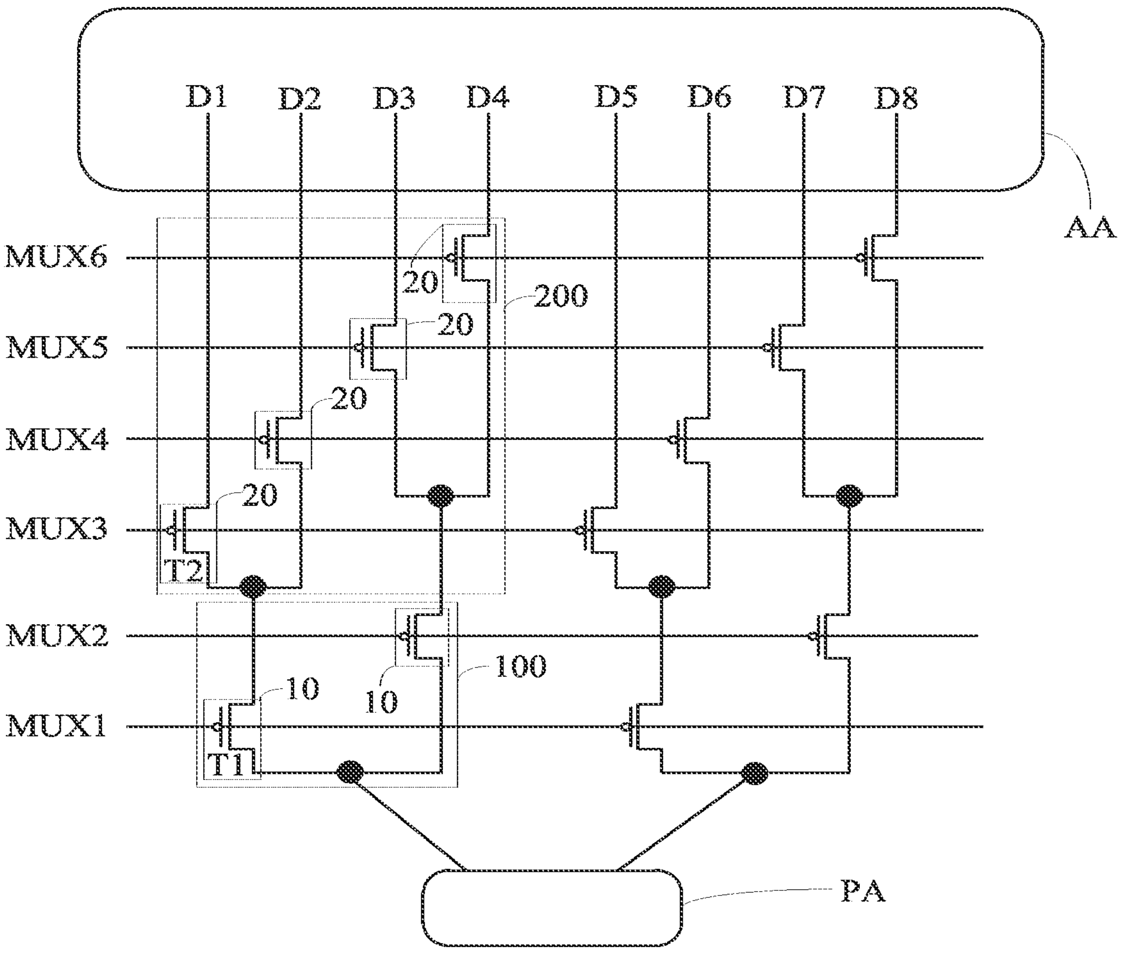
FIG. 1 is a structural schematic diagram of a demultiplexing circuit provided by one embodiment of the present disclosure.

As illustrated in FIG. 1, this embodiment provides a demultiplexing circuit, including at least an N−1th stage demultiplexing subcircuit 100 and an Nth stage demultiplexing subcircuit 200. The N−1th stage demultiplexing subcircuit 100 includes at least M N−1th stage demultiplexing units 10 configured to respond to N−1th stage control signals to time-sharingly output corresponding N−1th stage data signals. The Nth stage demultiplexing subcircuit 200 includes at least M+1 Nth stage demultiplexing units 20. An input terminal of the Nth stage demultiplexing subcircuit 200 is connected to an output terminal of the N−1th stage demultiplexing subcircuit 100, configured to respond to Nth stage control signals to time-sharingly output corresponding Nth stage data signals. Wherein, an output terminal of one N−1th stage demultiplexing unit 10 is connected to at least two input terminals of the Nth stage demultiplexing units 20, and M and N are both integers not less than 2.

It can be understood that one N−2th stage data signal is configured to be received by input terminals of at least two N−1th stage demultiplexing units 10, and a corresponding part of the N−2th stage data signal is time-sharingly outputted as M N−1th stage data signals from corresponding N−1th stage demultiplexing units 10 sequentially under time sharing control of corresponding or different N−1th stage control signals. An output terminal of at least one of the N−1th stage demultiplexing units 10 is connected to output terminals of two Nth stage demultiplexing units 20, and one of the N−1th data signals is time-sharingly outputted as at least two Nth stage data signals by at least two Nth stage demultiplexing units 20 under time sharing control of corresponding or different Nth stage control signals, that is, the corresponding Nth stage demultiplexing units 20 time-sharingly output at least M+1 Nth stage data signals in sequence. That is, after one N−2th stage data signal is processed by the demultiplexing circuit of this embodiment, at least M+1 Nth stage data signals are outputted time-sharingly. Compared to circuits of a same type in the prior art, the present disclosure can time-sharingly output a same input signal as more input signals and even effect fission, triggering geometric growth, which can further reduce a number of wirings for transmitting input signals, thereby reducing a space occupied thereof. Furthermore, when N is equal to 2, the N−2th stage data signal is an initial data signal; that is, the data signal before being inputted into the demultiplexing circuit provided by this embodiment. The initial data signal is correspondingly connected to an input terminal of a first-stage demultiplexing circuit. When a corresponding initial data signal is processed by the demultiplexing circuit provided by this embodiment, data signals DS outputted from the last stage demultiplexing circuit are required to be written into corresponding subpixels for display.

In one embodiment, the Nth stage demultiplexing subcircuit 200 includes at least 2M Nth stage demultiplexing units 20. An input terminal of one N−1th stage demultiplexing unit 10 is at least connected to an input terminal of another N−1th stage demultiplexing unit 10. Different N−1th stage demultiplexing units respond to different N−1th stage control signals. An input terminal of one Nth stage demultiplexing unit 20 is at least connected to an input terminal of another Nth stage demultiplexing unit 20. Different Nth stage demultiplexing units 20 respond to different Nth stage control signals.

It can be understood that in this embodiment, after a same input signal is processed by the demultiplexing circuit, at least $M^N$ input signals can be outputted time-sharingly in sequence, realizing fission of geometric growth of the input signals to further reduce the number of wirings of the input signals.

Furthermore, the N−1th stage demultiplexing units 10 include N−1th stage thin film transistors T1. Input terminals of at least two N−1th stage thin film transistors T1 are correspondingly configured to receive one input signal. A control terminal of each N−1th stage thin film transistor T1 is correspondingly configured to receive one N−1th stage control signal.

Wherein, the Nth stage demultiplexing units 20 include Nth stage thin film transistors T2. Input terminals of at least two Nth stage thin film transistors are connected to the output terminal of one N−1th stage thin film transistor T1. A control terminal of each Nth stage thin film transistor T2 is correspondingly configured to receive one Nth stage control signal.

It should be noted that the input terminal of a thin film transistor can be one of a drain electrode or a source electrode of a corresponding thin film transistor. An output terminal of the corresponding thin film transistor can be another drain electrode or source electrode thereof, and the control terminals of the corresponding thin film transistor can be a gate electrode thereof.

It should be noted that a type of channels of the N−1th stage thin film transistor T1 and the Nth stage thin film transistor T2 can be, but are not necessarily, same. For example, the channel types of the N−1th stage thin film transistor T1 and the Nth stage thin film transistor T2 can both be N-channel type thin film transistors or P-channel type thin film transistors. The channel types of the N−1th stage thin film transistor T1 and the Nth stage thin film transistor T2 can be different. For example, the channel type of the N−1th stage thin film transistor T1 can be one of N-channel type thin film transistor or P-channel type thin film transistor, and the channel type of the Nth stage thin film transistor T2 can be the other one of the N-channel type thin film transistor or the P-channel type thin film transistor. It can be understood that regardless of the channel types of the N−1th stage thin film transistor T1 and the Nth stage thin film transistor, through configuration of corresponding control signals, the corresponding thin film transistors can be controlled to time-sharingly output corresponding input signals in sequence.

In one embodiment, the N−1th stage control signals include at least M N−1th stage control subsignals that are sequentially time sharing and effective. Each of the N−1th stage control subsignals is configured to be received by a control terminal of one N−1th stage thin film transistor T1. It can be understood that each N−1th control subsignal correspondingly controls one N−1th stage thin film transistor T1, allowing it to realize time-sharing output in sequence of corresponding input signals.

In one embodiment, the Nth stage control signals include at least 2M Nth stage control subsignals being sequentially time sharing and effective. Each of the Nth stage control subsignals is configured to be received by a control terminal of one Nth stage thin film transistor T2. It can be understood that each Nth stage control subsignal correspondingly controls one Nth stage thin film transistor T2, allowing it to again realize time sharing output in sequence of corresponding input signals.

In one embodiment, a frequency of the Nth stage control subsignals and a frequency of the N−1th stage control subsignals are same, that is, their periods are same, but duty cycles in one same period are different. For example, a duration of an effective electric potential of the N−1th stage control subsignals can be longer than or equal to two times of a duration of an effective electric potential of the Nth stage control subsignals. The duration of the effective electric potential can be similar or same as a time of turning on a corresponding thin film transistor.

Figure 2:
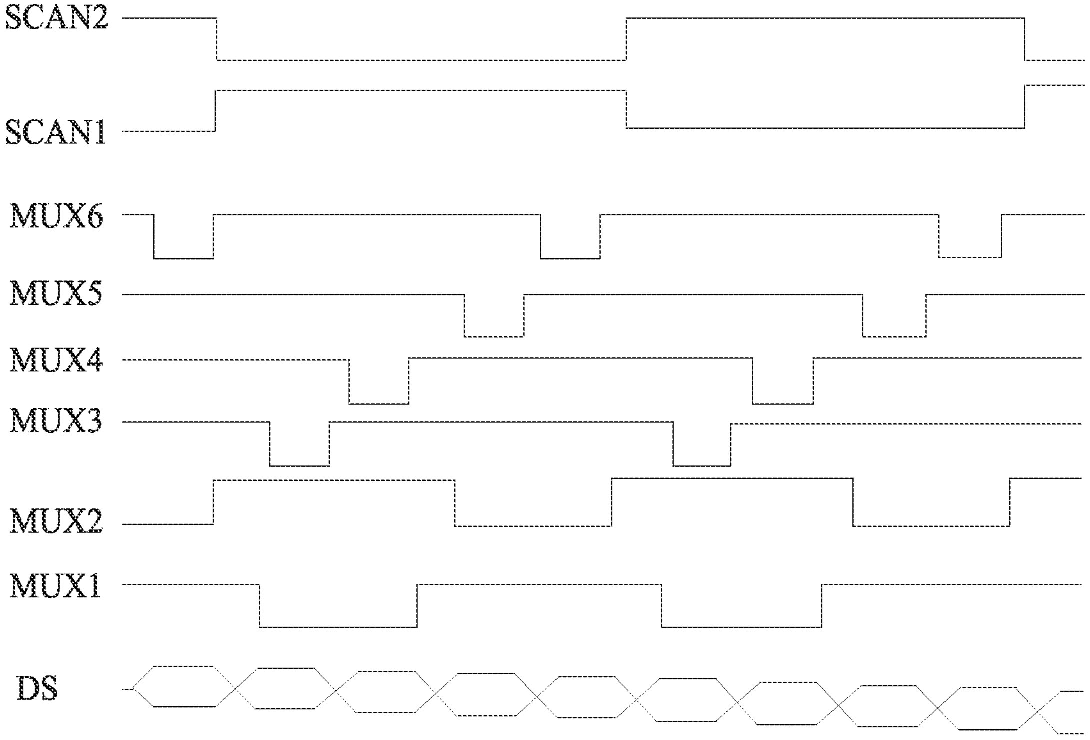
FIG. 2 is a time sequence schematic diagram of the demultiplexing circuit provided by one embodiment of the present disclosure.

As illustrated in FIG. 1 and FIG. 2, in one embodiment, when M and N are equal to 2, a first-stage demultiplexing subcircuit includes two N−1th stage demultiplexing units 10; each N−1th stage demultiplexing unit 10 includes one N−1th stage thin film transistor T1. A first first-stage control subsignal MUX1 controls a first N−1th stage thin film transistor, and a second first-stage subsignal MUX2 controls a second N−1th stage thin film transistor. A second-stage demultiplexing subcircuit includes four Nth stage demultiplexing units 20. Each Nth stage demultiplexing unit 20 includes one Nth stage thin film transistor T2. A first second-stage control subsignal MUX3 controls a first Nth stage thin film transistor. A second second-stage control subsignal MUX4 controls a second Nth stage thin film transistor. A third second-stage control subsignal MUX5 controls a third Nth stage thin film transistor. A fourth of second-stage control subsignal MUX6 controls a fourth Nth stage thin film transistor. Furthermore, an output terminal of the first N−1th stage thin film transistor and an input terminal of the first Nth stage thin film transistor are connected to an input terminal of the second Nth stage thin film transistor, and an output terminal of a second N−1th stage thin film transistor and an input terminal of a third Nth stage thin film transistor are connected to an input terminal of a fourth Nth stage thin film transistor. Correspondingly, when the input signals are the data signals DS, after they are processed by the demultiplexing circuit, the same data signals DS are time-sharingly and sequentially outputted by the first Nth stage thin film transistor, the second Nth stage thin film transistor, the third Nth stage thin film transistor, and the fourth Nth stage thin film transistor as a first data signal D1, a second data signal D2, a third data signal D3, and a fourth data signal D4. Correspondingly, when a same demultiplexing circuit exists, the demultiplexing circuit time-sharingly outputs a fifth data signal D5, a sixth data signal D6, a seventh data signal D7, and an eighth data signal D8 in sequence.

As illustrated in FIG. 2, it can be understood that a first first-stage control subsignal MUX1 is in an effective electric potential state, when scanning signals S1 of odd rows are in a high electric potential time period. For example, the first first-stage control subsignal MUX1 is in a low electric potential state, which is able to control a corresponding thin film transistor to turn on. The first second-stage control subsignal MUX3 and the second second-stage control subsignals MUX4 time-sharingly control corresponding thin film transistors to turn on to time-sharingly output corresponding data signals DS. Then, while scanning signals S2 of even rows are in a high electric potential, the second first-stage control subsignal MUX2 is in an effective electric potential state—for example, in a low electric potential state. The third second-stage control subsignal MUX5 and the fourth second-stage control subsignal MUX6 time-sharingly control corresponding thin film transistors to turn on to time-sharingly output the corresponding data signals DS. When a plurality of demultiplexing circuits exist, it can also continue an aforementioned sequence of turning on sequentially and perform a sequential task.

Figure 3:
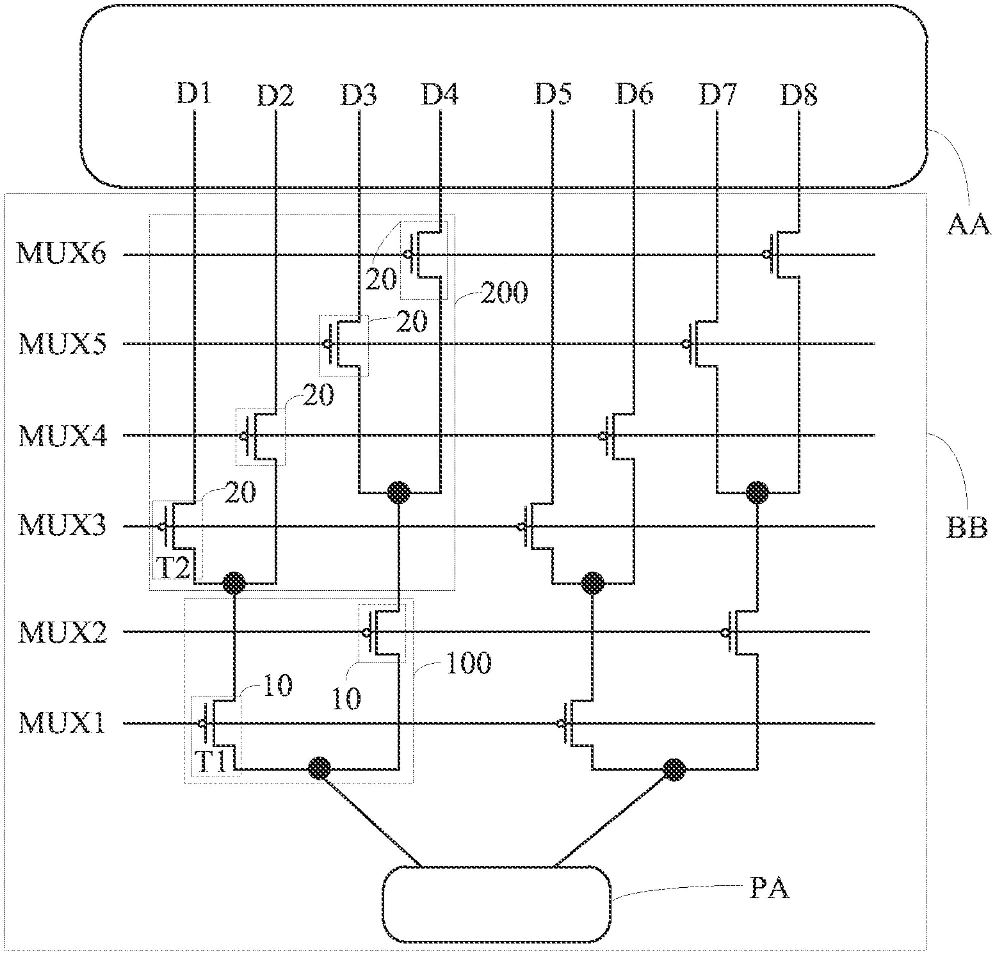
FIG. 3 is a structural schematic diagram of a display panel provided by one embodiment of the present disclosure.

As illustrated in FIG. 3, in one embodiment, the present disclosure provides a display panel. A display region AA and a bezel region BB located on a side of the display region AA are disposed in the display panel. A demultiplexing circuit is disposed in the bezel region BB. The demultiplexing circuit includes at least the N−1th stage demultiplexing subcircuit 100 and the Nth stage demultiplexing subcircuit 200. The N−1th stage demultiplexing subcircuit 100 includes at least M N−1th stage demultiplexing units 10 configured to response N−1th stage control signals to time-sharingly output corresponding N−1th stage data signals. The Nth stage demultiplexing subcircuit 200 includes at least M+1 Nth stage demultiplexing units 20, and an input terminal of the Nth stage demultiplexing subcircuit 200 is connected to an output terminal of the N−1th stage demultiplexing subcircuit 100 for responding to Nth stage control signals to time-sharingly output corresponding Nth stage data signals. The Nth stage demultiplexing subcircuit 200 includes at least M+1 Nth stage demultiplexing units 20, and an input terminal of the Nth stage demultiplexing subcircuit 200 is connected to an output terminal of the N−1th stage demultiplexing subcircuit 100, configured to respond to Nth stage control signals to time-sharingly output corresponding Nth stage data signals. Wherein, an output terminal of one N−1th stage demultiplexing unit 10 is connected to at least two input terminals of the Nth stage demultiplexing units 20, and M and N are both integers not less than 2.

It should be noted that in one embodiment, the bezel region BB is located on a bottom side of the display region AA; that is, when facing the display panel, the bezel region BB is located on the bottom side on the display region AA. At the same time, at least one pad PA can be configured on the bezel region BB for welding transmission lines for corresponding input signals.

It can be understood that by disposing at least two stages of demuxing subcircuits in cascade, the display panel of this embodiment can make one signal time-sharingly multiplex to a plurality of signals, which can exponentially reduce a number of the signal wirings correspondingly, thereby reducing a space occupied thereof.

Figure 4:
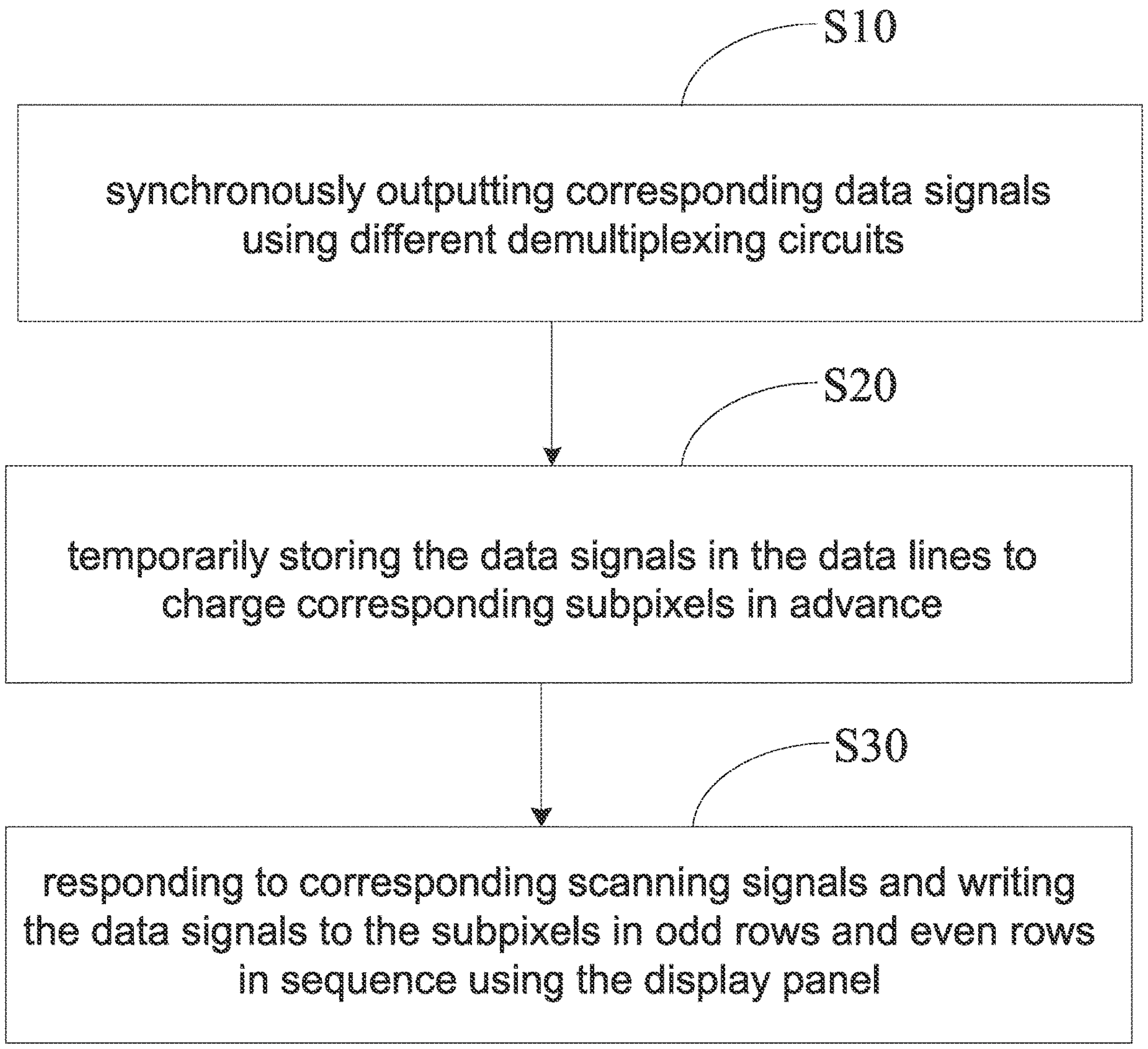
FIG. 4 is a flowchart of a driving method of the display panel provided by one embodiment of the present disclosure.

In one embodiment, the present disclosure provides a driving method of the display panel. The display panel includes at least two demultiplexing circuits, a plurality of subpixels distributed in an array manner, and data lines connected between the demultiplexing circuits and the subpixels. The demultiplexing circuit at least includes the cascaded N−1th stage demultiplexing subcircuit 100 and Nth stage demultiplexing subcircuit 200. As illustrated in FIG. 2 and/or FIG. 4, the driving method includes at least following steps: step S10: synchronously outputting corresponding data signals DS using different demultiplexing circuits; step S20: temporarily storing the data signals in the data lines DS to charge corresponding subpixels in advance; and step S30: responding to corresponding scanning signals and writing the data signals to the subpixels in odd rows and even rows in sequence using the display panel; wherein, N is an integer not less than 2.

It should be noted that in this embodiment, the plurality of demultiplexing circuits work synchronously, being able to synchronously charge the corresponding subpixels in advance, reduce pre-charging time and a number of the transmission lines of control signals of corresponding stages, allowing the plurality of demultiplexing circuits to share a group of the control signals, reducing a number of wirings in bezels and a space occupied thereof, and reducing costs. The output terminals of the demultiplexing circuits are connected to corresponding data lines. One data line is connected to subpixels in a same column or two adjacent columns. Before an effective electric level of the scanning signals is present, the data signals DS are temporarily stored in the data lines. Because parasitic capacitors or coupling capacitors exist between the data lines or adjacent data lines, the data signals DS can be temporarily stored in corresponding capacitors. Until the effective electric level of the scanning signals is present, the data signals DS are written into the corresponding subpixels. The pre-charging function provided by this embodiment can improve charging efficiency of the data signals DS to remedy insufficient charging.

In one embodiment, the display panel responds to corresponding scanning signals; that is, the scanning signals S1 of the odd rows sequentially turn on the subpixels of the odd rows. The N−1th stage demultiplexing subcircuit 100 responds to the N−1th stage control signals to time-sharingly output at least two first data subsignals. The Nth stage demultiplexing subcircuit 200 responds to the Nth stage control signals to time-sharingly output at least four second data subsignals to the subpixels of corresponding columns. The display panel responds to corresponding scanning signals; that is, the scanning signals S2 of the even rows sequentially turn on the subpixels of the even rows. The N−1th stage demultiplexing subcircuit 100 responds to the N−1th stage control signals to time-sharingly output at least two first data subsignals. The Nth stage demultiplexing subcircuit 200 responds to the Nth stage control signals to time-sharingly output at least four second data subsignals to the subpixels of corresponding columns. Wherein, N is an integer not less than 2. Furthermore, in the time sequence, the effective electric potential periods of two adjacent Nth stage control subsignals are in the effective electric potential periods of one N−1th stage control subsignals.

It can be understood that by disposing at least two stages of the demuxing subcircuits in cascade, the driving method of the display panel of this embodiment can make one signal time-sharingly multiplex to a plurality of signals, which can exponentially reduce the number of signal wirings correspondingly, thereby reducing a space occupied thereof.

It can be understood, that for those of ordinary skill in the art, various other corresponding changes and modifications can be made according to the technical solutions and technical ideas of the present disclosure, and all such changes and modifications are intended to fall within the scope of protection of the claims of the present disclosure.

What is claimed is:

1. A display panel, wherein a demultiplexing circuit is disposed in the display panel, and the demultiplexing circuit comprises at least:

an N−1th stage demultiplexing subcircuit, wherein the N−1th stage demultiplexing subcircuit comprises at least M N−1th stage demultiplexing units configured to respond to N−1th stage control signals to time-sharingly output corresponding N−1th stage data signals; and an Nth stage demultiplexing subcircuit, wherein the Nth stage demultiplexing subcircuit comprises at least M+1 Nth stage demultiplexing units, and an input terminal of the Nth stage demultiplexing subcircuit is connected to an output terminal of the N−1th stage demultiplexing subcircuit configured to respond to Nth stage control signals to time-sharingly output corresponding Nth stage data signals, wherein an output terminal of one N−1th stage demultiplexing unit is connected to at least two input terminals of the Nth stage demultiplexing units, and M and N are both integers not less than 2.

2. The display panel as claimed in claim 1, wherein the Nth stage demultiplexing units comprise at least 2M Nth stage demultiplexing units, an input terminal of one N−1th stage demultiplexing units is at least connected to an input terminal of another N−1th stage demultiplexing unit; different N−1th stage demultiplexing units respond to different N−1th stage control signals, an input terminal of one Nth stage demultiplexing unit is at least connected to an input terminal of another Nth stage demultiplexing unit, and different Nth stage demultiplexing units respond to different Nth stage control signals.

3. The display panel as claimed in claim 2, wherein the N−1th stage demultiplexing units comprise an N−1th stage thin film transistor;

an input terminal of the N−1th stage thin film transistor is configured to receive an N−2th stage data signal; and a control terminal of the N−1th stage thin film transistor is correspondingly configured to receive the N−1th stage control signals, wherein when N is equal to 2, the N−2th stage data signal is an initial data signal.

4. The display panel as claimed in claim 3, wherein the Nth stage demultiplexing units comprise an Nth stage thin film transistor, an output terminal of one N−1th stage thin film transistor is connected to at least two output terminals of the N−1th stage thin film transistor; and the control terminal of the Nth stage thin film transistor is correspondingly configured to receive the Nth stage control signals.

5. The display panel as claimed in claim 4, wherein channel types of the N−1th stage thin film transistors and the Nth stage thin film transistors are same.

6. The display panel as claimed in claim 5, wherein the N−1th stage control signals comprise at least M N−1th stage control subsignals that are sequentially time sharing and effective, and each of the N−1th stage control subsignals is configured to be received by a control terminal of one N−1th stage thin film transistor.

7. The display panel as claimed in claim 6, wherein the Nth stage control signals comprise at least 2M Nth stage control subsignals that are sequentially time sharing and effective, and each of the Nth stage control subsignals is configured to be received by a control terminal of one Nth stage thin film transistor.

8. The display panel as claimed in claim 7, wherein a frequency of the Nth stage control subsignals and a frequency of the N−1th stage control subsignals are same, and a duration of an effective electric potential of the N−1th stage control subsignals are longer than or equal to two times of a duration of an effective electric potential of the Nth stage control subsignals.

9. A driving method of a display panel, wherein the display panel comprises at least two demultiplexing circuits as claimed in claim 1, a plurality of subpixel distributed in an array manner, and a plurality of data lines connected between the demultiplexing circuits and the subpixels, the driving method comprising at least:

synchronously outputting corresponding data signals using different demultiplexing circuits;

temporarily storing the data signals in the data lines to charge corresponding subpixels in advance; and responding to corresponding scanning signals and writing the data signals to the subpixels in odd rows and even rows in sequence using the display panel;

wherein N is an integer not less than 2.

10. The driving method as claimed in claim 9, wherein the Nth stage demultiplexing units comprise at least 2M Nth stage demultiplexing units;

an input terminal of one N−1th stage demultiplexing units is at least connected to an input terminal of another N−1th stage demultiplexing unit; different N−1th stage demultiplexing units respond to different N−1th stage control signals; an input terminal of one Nth stage demultiplexing unit is at least connected to an input terminal of another Nth stage demultiplexing unit; and different Nth stage demultiplexing units respond to different Nth stage control signals.

11. The driving method as claimed in claim 10, wherein the N−1th stage demultiplexing units comprise an N−1th stage thin film transistor;

an input terminal of the −1th stage thin film transistor is configured to receive an N−2th stage data signal, and a control terminal of the N−1th stage thin film transistor is correspondingly configured to receive the N−1th stage control signals, wherein when N is equal to 2, the N−2th stage data signal is an initial data signal.

12. The driving method as claimed in claim 11, wherein the Nth stage demultiplexing units comprise an Nth stage thin film transistor, one output terminal of the N−1th stage thin film transistors is connected to at least two output terminals of the Nth stage thin film transistor, and the control terminal of the Nth stage thin film transistor is correspondingly configured to receive the Nth stage control signals.

13. A display device, wherein a display region and a bezel region located on a side of the display region are disposed in the display device; a demultiplexing circuit is disposed in the bezel region; and the demultiplexing circuit comprises at least:

an N−1th stage demultiplexing subcircuit, wherein the N−1th stage demultiplexing subcircuit comprises at least M N−1th stage demultiplexing units configured to respond to N−1th stage control signals to time-sharingly output corresponding N−1th stage data signals; and an Nth stage demultiplexing subcircuit, wherein the Nth stage demultiplexing subcircuit comprises at least M+1 Nth stage demultiplexing units, and an input terminal of the Nth stage demultiplexing subcircuit is connected to an output terminal of the N−1th stage demultiplexing subcircuit configured to respond to Nth stage control signals to time-sharingly output corresponding Nth stage data signals, wherein an output terminal of the N−1th stage demultiplexing units is connected to at least two input terminals of the Nth stage demultiplexing units, and M and N are both integers greater than or equal to 2.

14. The display device as claimed in claim 13, wherein the Nth stage demultiplexing units comprise at least 2M Nth stage demultiplexing units;

an input terminal of one N−1th stage demultiplexing units is at least connected to an input terminal of another N−1th stage demultiplexing unit; different N−1th stage demultiplexing units respond to different N−1th stage control signals, an input terminal of one Nth stage demultiplexing unit is at least connected to an input terminal of another Nth stage demultiplexing unit, and different Nth stage demultiplexing units respond to different Nth stage control signals.

15. The display device as claimed in claim 14, wherein the N−1th stage demultiplexing units comprise an N−1th stage thin film transistor;

an input terminal of the N−1th stage thin film transistor is configured to receive an N−2th stage data signal; and a control terminal of the N−1th stage thin film transistor is correspondingly configured to receive the N−1th stage control signals, wherein when N is equal to 2, the N−2th stage data signal is an initial data signal.

16. The display device as claimed in claim 15, wherein the Nth stage demultiplexing units comprise an Nth stage thin film transistor one output terminal of the N−1th stage thin film transistors is connected to at least two output terminals of the N−1th stage thin film transistor; and a control terminal of the Nth stage thin film transistor is correspondingly configured to receive the Nth stage control signals.

17. The display device as claimed in claim 16, wherein channel types of the N−1th stage thin film transistors and the Nth stage thin film transistors are same.

18. The display device as claimed in claim 17, wherein the N−1th stage control signals comprise at least M N−1th stage control subsignals that are sequentially time sharing and effective, and each of the N−1th stage control subsignals is configured to be received by a control terminal of one N−1th stage thin film transistor.

19. The display device as claimed in claim 18, wherein the Nth stage control signals comprise at least 2M Nth stage control subsignals that are sequentially time sharing and effective, and each of the Nth stage control subsignals is configured to be received by a control terminal of one Nth stage thin film transistor.

20. The display device as claimed in claim 19, wherein a frequency of the Nth stage control subsignals and a frequency of the N−1th stage control subsignals are same, and a duration of an effective electric potential of the N−1th stage control subsignals are longer than or equal to two times of a duration of an effective electric potential of the Nth stage control subsignals.

* * * * *